Figure 1A:
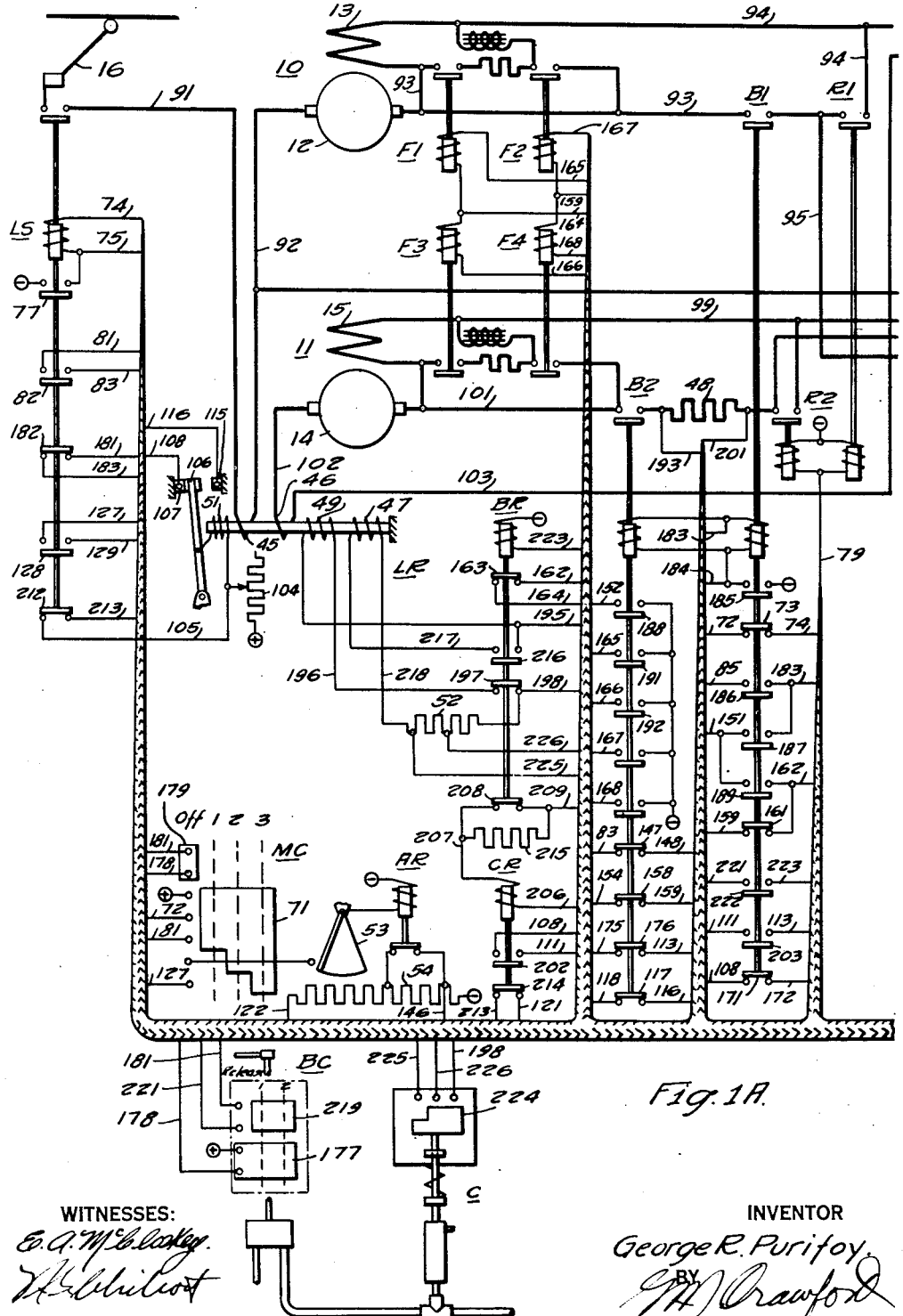

Oct. 5, 1943.　　　　G. R. PURIFOY　　　　2,331,228
MOTOR CONTROL SYSTEM
Filed March 19, 1942　　　　2 Sheets-Sheet 1

WITNESSES:　　　　　　　　　　　　　　INVENTOR
　　　　　　　　　　　　　　　　　George R. Purifoy,
　　　　　　　　　　　　　　　　　BY
　　　　　　　　　　　　　　　　　　ATTORNEY

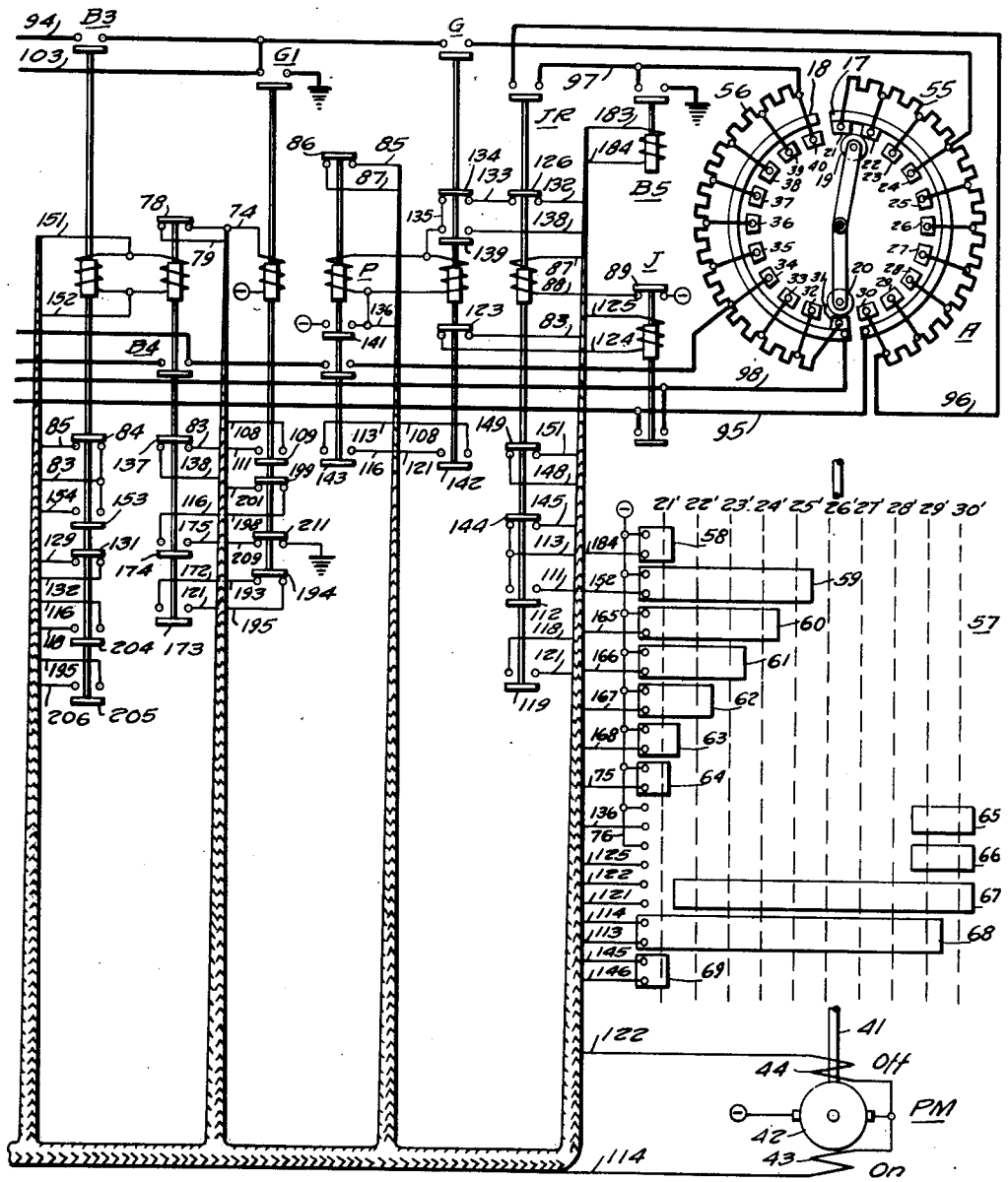

Patented Oct. 5, 1943

2,331,228

UNITED STATES PATENT OFFICE 2,331,228

MOTOR CONTROL SYSTEM

George R. Purifoy, Pittsburgh, Pa., assignor to Westinghouse Electric & Manufacturing Company, East Pittsburgh, Pa., a corporation of Pennsylvania Application March 19, 1942, Serial No. 435,379

12 Claims. (Cl. 172—179)

My invention relates, generally, to motor control systems and, more particularly, to systems for controlling the operation of the propelling motors of electric vehicles such as street cars, subway and rapid transit trains.

An object of my invention, generally stated, is to provide an automatic control system for electrically propelled vehicles which shall be simple and efficient in operation and which may be economically manufactured and installed.

A more specific object of my invention is to provide for series-parallel operation of traction motors which are controlled by an accelerator.

Another object of my invention is to simplify the structure and operation of the accelerator utilized for series-parallel operation of traction motors.

Still another object of my invention is to provide dynamic braking for traction motors having series-parallel operation with accelerator control.

A still further object of my invention is to provide a system suitable for controlling either a single car or a plurality of cars operated in multiple-unit trains.

Other objects of my invention will be explained fully hereinafter or will be apparent to those skilled in the art.

In accordance with my invention, series-parallel acceleration and dynamic braking of the traction motors of an electric vehicle are primarily controlled by a two-roller accelerator of the type described in Patent No. 1,991,229, issued February 12, 1935 to L. G. Riley. The accelerator runs in one direction for series operation of the motors and for dynamic braking, and in the opposite direction for parallel operation. The transition from series to parallel connections is made by the bridging method.

For a fuller understanding of the nature and objects of my invention, reference may be had to the following detailed description, taken in conjunction with the accompanying drawings in which:

Figures 1A and 1B, when combined, constitute a diagrammatic view of a control system embodying my invention; and Fig. 2 is a chart showing the sequence of operation of a portion of the apparatus illustrated in Figs. 1A and 1B.

Referring to the drawings, which illustrate a preferred embodiment of my invention, a pair of electric motors 10 and 11 may be utilized for propelling a vehicle (not shown). The motor 10 is provided with an armature winding 12 and a series field winding 13. Likewise, the motor 11 is provided with an armature winding 14 and a series field winding 15. A line switch LS is provided for connecting the motors 10 and 11 to a trolley 16 which may be energized from a source of power through suitable power conductors.

During acceleration of the vehicle, the motors 10 and 11 are first connected in series-circuit relation and then in parallel-circuit relation. A switch JR is provided for making the series connection and switches P and G are provided for making the parallel-circuit connections. The transition from series to parallel operation is by the bridging method and is made by a switch J.

The motors 10 and 11 may also be connected for dynamic braking with the field winding 15 of the motor 11 connected across the armature 12 of the motor 10 and the field winding 13 of the motor 10 connected across the armature 14 of the motor 11, thereby permitting the current in the armature windings to reverse and cause the motors to act as generators and decelerate the vehicle. Four switches B1, B2, B3 and B4 are provided for establishing the dynamic braking connections. A switch B5 is also closed during dynamic braking to connect the midpoint of the motor circuit to ground, thereby reducing the maximum potential to ground of the motor circuit.

Field shunting switches F1, F2, F3 and F4 are provided for shunting the field windings of the motors in order to increase their speed by weakening the excitation of the motor fields in a manner well known in the art. The field shunting switches F1 and F3 are also closed during coasting of the vehicle in order to reduce the circulating current through the motors while they are coasting.

Both the acceleration and the deceleration of the motors 10 and 11 are primarily controlled by a motor driven accelerator A which is of the same general type as the one described in the aforementioned Patent No. 1,991,229. The accelerator A comprises a pair of semi-circular buses 17 and 18 inside of which are disposed a plurality of contact fingers 21 to 40, inclusive, which are progressively forced against the buses 17 and 18 by a pair of revolving rollers 19 and 20. The rollers 19 and 20 are driven by a pilot motor PM through a shaft 41. The pilot motor PM is provided with an armature winding 42 and two field windings 43 and 44, one for each direction of rotation. The motor PM may be energized from a battery or other suitable source of power.

A limit relay LR is provided for controlling the operation of the pilot motor PM during both acceleration and deceleration of the vehicle. As shown, the relay LR is provided with several different actuating coils which function to operate the relay during coasting of the vehicle as well as during acceleration and dynamic braking. Thus, coils 45 and 46 are connected in the motor circuits and are responsive to the motor current during both acceleration and dynamic braking. A coil 47 is connected across a resistor 48 which is in the motor circuit during dynamic braking. Therefore, the coil 47 is also responsive to the motor current during dynamic braking. A coil 49 is also connected across the resistor 48 during coasting of the vehicle. Since the braking circuit for the motors is established during coasting, the coil 49 is responsive to the current which circulates through the motors during coasting. The circulating current is proportional to the vehicle speed, therefore the relay LR may be utilized for spotting the accelerator A in accordance with the vehicle speed, as will be described more fully hereinafter. The relay LR is also provided with a tickler coil 51 which functions to cause a vibratory action of the relay in a manner well known in the art.

As fully described in my copending application, Serial No. 435,378, filed March 19, 1942, an air operated relay C is provided on each vehicle of a train to coordinate the operation of the air-brake system and the dynamic braking of the vehicles. As shown in the drawings, the relay C is connected to the air line of the air brake system and is therefore responsive to the air-brake pressure which is controlled by a braking controller BC. The relay C is provided with contact members which successively shunt portions of a resistor 52 from the circuit for the rate coil 47 on the limit relay LR. In this manner the operation of the relay LR and hence the rate of dynamic braking is controlled by the relay C which is responsive to the air-brake pressure. Since the maximum effect of the air-brake system is obtained by applying maximum air-brake pressure to the braking system, it will be seen that the maximum effect of the electrical or dynamic braking system is likewise obtained as a result of the maximum air pressure to the braking system.

The speed of the pilot motor PM during acceleration is controlled by an accelerating relay AR, the actuating coil of which is energized through a retardation controller 53, as described in Patent No. 2,130,858, issued September 20, 1938 to L. G. Riley. The retardation controller 53 is an inertia or pendulum device that responds to acceleration and deceleration impulses and may be utilized to govern the accelerating rate of the vehicle.

When a master controller MC is actuated to position 2, the actuating coil of the relay AR is energized at a predetermined rate of acceleration and the contact members of the relay AR are utilized to vary a resistor 54 which is connected across the armature winding and one of the field windings of the pilot motor PM. In this manner the relay AR controls the speed of the pilot motor in accordance with the operation of the pendulum device 53, which in turn is responsive to the rate of acceleration of the vehicle. Accordingly, the speed of operation of the accelerator A is governed to maintain a predetermined accelerating rate.

The accelerator A is provided with resistors 55 and 56 for controlling the current in the motors 10 and 11. The resistor 55 is divided into a number of sub-divisions which are connected to the fingers 21 to 30, inclusive, and the resistor 56 is divided into sub-divisions which are connected to the contact fingers 31 to 40, inclusive. As explained hereinbefore, the accelerator A is operated in a forward or "on" direction while the motors 10 and 11 are connected in series-circuit relation. The accelerator is operated in a reverse or "off" direction while the motors 10 and 11 are connected in parallel-circuit relation. During dynamic braking the accelerator is again operated in the forward or "on" direction.

In this manner the structure of the accelerator is simplified, since it is necessary to provide only two rollers instead of three as in prior installations where series-parallel operation of the main motors is desired. The operation of the accelerator in either direction is at all times under the control of the limit relay LR, thereby controlling the motor current, as will be described more fully hereinafter.

As shown, the accelerator A is provided with a drum switch 57 having a plurality of contact segments 58 to 69, inclusive, and cooperating contact fingers which engage the contact segments as the accelerator is driven by the shaft 41. The reference numerals 21' to 30' indicate the contact fingers over which the roller 19 travels while the contact segments are engaged by their respective contact fingers. It will be seen that the roller 20 travels over the contacts 31 to 40 while the roller 19 is travelling over the fingers 21 to 30. The function of the different segments of the drum switch 57 will be explained more fully hereinafter.

In addition to the accelerator and the control switches previously mentioned, numerous other switches are provided and perform certain switching operations. These include switches R1 and R2 for connecting the motors to the accelerator during acceleration of the vehicle and a switch G1 for connecting the motors to ground through the accelerator resistors during acceleration of the vehicle. In addition to establishing the dynamic braking connections, the switches B3 and B4 are also utilized to connect the motors directly to ground through the switch G1 after the accelerator resistors have been shunted from the motor circuit by the accelerator rollers.

In order to permit the present system to be utilized on cars which are operated in multiple-unit trains and controlled from one control station at the head of the train, a braking relay BR is provided which permits dynamic braking to be established simultaneously on all of the cars of a train. The energization of the relay BR is controlled by the braking controller BC which, as explained hereinbefore, may also be utilized to control the air-brake system. Thus, when the braking controller at the head of the train is operated, all of the relays BR throughout the train are energized to permit dynamic braking to be established on all of the motors in the train. The controllers MC and BC are electrically interlocked to prevent improper operation of the equipment.

As described in a copending application of L. R. Riley, Serial No. 273,876, filed May 16, 1939, a coasting relay CR is utilized to provide smoother operation of multiple-unit trains when power is reapplied to the motors in the train after a stop has been made by means of dynamic braking. The actuating coil of the relay CR is energized only during spotting or braking and the relay functions to prevent the accelerator from starting to advance while the train is standing still, since the coil of the relay CR is responsive to the counter-electromotive force of one of the motors of a car.

It has been found that in multiple-unit trains the accelerators on the different cars may start spotting as a result of the operation of the limit relay LR if the operator moves the braking controller to the "off" position while the train is standing still. Thus, when power is reapplied to the motors by operating the master controller the accelerators may not all be at the right position for the reapplication of power, thereby resulting in rough or uneven operation of the train. Since the relay CR is responsive to the motor speed, its contact members are so connected in the circuit for the pilot motor that the advancement of the accelerator is prevented while the train is standing still.

In order that the functioning of the foregoing apparatus may be more clearly understood, the operation of the system will now be described in more detail.

Assuming that it is desired to accelerate the vehicle at the maximum rate, the controller MC is actuated to position 3, thereby applying power to the motor 10 and 11 which are first connected in series-circuit relation and then in parallel-circuit relation. When the controller MC is actuated to position 1, the switches LS, G1, R1, R2 and JR are closed to connect the motors 10 and 11 to the power source in series-circuit relation and in series with the resistors 55 and 56 of the accelerator A. The energizing circuit for the actuating coil of the switch LS may be traced from positive through a segment 71 of the controller MC, conductor 72, an interlock 73 on the switch B1, conductor 74, the coil of the switch LS, conductor 75, the contact segment 64 of the drum switch 57 and conductor 76 to negative. A holding circuit for the coil of the switch LS is established through an interlock 77 on the switch LS. The energizing circuit for the switch G1 extends from the conductor 74, through the actuating coil of the switch G1 to negative. Likewise, the energizing circuit for the switches R1 and R2 extends from the conductor 74 through an interlock 78 on the switch B4, conductor 79 and the actuating coils of the switches R1 and R2 to negative.

Following the closing of the switch LS, the switch JR is closed to complete the motor connections. The energizing circuit for the switch JR may be traced from positive through the segment 71 of the controller MC, conductor 81, an interlock 82 on the switch LS, conductor 83, an interlock 84 on the switch B3, conductor 85, an interlock 86 on the switch P, conductor 87, the actuating coil of the switch JR, conductor 88 and an interlock 89 on the switch J to negative.

The closing of the switches LS, R1, R2, JR and G1 connects the motors across the power source in series-circuit relation. The circuit through the motors may be traced from the current collector 16 through the line switch LS, conductor 91, the coil 45 of the relay LR, conductor 92, the armature winding 12, conductor 93, the field winding 13, conductor 94, the switch R1, conductor 95, the bus 17 of the accelerator A, contact finger 21, the resistor 55, conductor 96, the switch JR, conductor 97, the resistor 56, contact finger 31, the bus 18, conductor 98, the switch R2, conductor 99, the field winding 15, conductor 101, the armature winding 14, conductor 102, the coil 46 of the relay LR, conductor 103 and the switch G1 to ground.

Since the resistors 55 and 56 of the accelerator A are connected in the motor circuit, acceleration of the motors is controlled by the accelerator. The accelerator is driven by the pilot motor PM under the control of the limit relay LR which controls the energization of the pilot motor and the relay AR which controls the speed of the pilot motor, as explained hereinbefore. The pilot motor is energized at this time through a circuit which may be traced from positive through a resistor 104, conductor 105, the tickler coil 51 and contact members 106 and 107 of the relay LR, conductor 108, an interlock 109 on the switch G1, conductor 111, an interlock 112 on the switch JR, conductor 113, the segment 68 of the drum switch 57, conductor 114, the "on" field winding 43 of the pilot motor and the armature winding 42 to negative.

As explained hereinbefore, pilot motor PM advances the accelerator A under the control of the limit relay LR, the operation of which is governed by the motor current. Since the coils 45 and 46 of the relay LR are energized by the motor current, the contact members 106 and 107 of the relay are opened to interrupt the circuit for the pilot motor when the main motor current exceeds a predetermined amount.

In the event that the main motor current reaches a still higher value, the contact member 106 will engage a contact member 115 to establish a circuit through the "off" field winding of the pilot motor thereby causing the accelerator to be returned towards its initial position to reinsert resistances in the main motor circuit. The energizing circuit for the pilot motor for reverse operation may be traced from the contact member 115 of the relay LR through conductor 116, interlock 117 of the switch B2, conductor 118, an interlock 119 of the switch JR, conductor 121, the segment 67 of the drum switch 57, conductor 122, the "off" field winding 44 of the pilot motor PM and the armature winding 42 to negative.

As explained hereinbefore, the pendulum device 53 and the relay AR function to regulate the speed of the pilot motor PM to govern the rate of acceleration of the vehicle. The contact members of the relay AR are disposed to shunt a portion of the resistor 54 which is connected across the armature winding of the motor PM by the conductor 122 and the negative connection, thereby varying the motor speed in accordance with the operation of the pendulum device 53, which in turn is responsive to the rate of acceleration of the vehicle.

When the accelerator A nears the end of its travel in the forward direction, the switch J is operated to effect transition of the motors from series to parallel operation. The energizing circuit for the actuating coil of the switch J may be traced from the controller MC through conductor 81, the interlock 82 on the switch LS, conductor 83, an interlock 123 on the switch G, conductor 124, the actuating coil of the switch J, conductor 125, the contact segment 66 of the drum switch 57 and the interlock 77 to negative.

The closing of the switch J deenergizes the switch JR by interrupting the circuit through the interlock 89 on the switch J. The opening of the switch JR establishes an energizing circuit for the switches P and G through an interlock 126 on the switch JR. The energizing circuit for the switches P and G may be traced from the controller MC through conductor 127, an interlock 128 on the switch LS, conductor 129, an interlock 131 on the switch B3, conductor 132, the interlock 126 on the switch JR, conductor 133, an interlock 134 on the switch G, conductor 135, the actuating coils of the switches P and G, conductor 136, the segment 65 of the drum switch 57 and the conductor 76 to negative.

When the switch G is closed the energizing circuit for the coils of the switches P and G is transferred to a circuit which extends from the controller MC, through conductor 81, the interlock 82 on the switch LS, conductor 83, an interlock 137 on the switch B4, conductor 138, an interlock 139 on the switch G, conductor 135 and thence through the actuating coils of the switches P and G to negative through a circuit previously traced. A holding circuit for the switches P and G is established through an interlock 141 on the switch P.

The closing of the switch G deenergizes the actuating coil of the switch J by the interruption of the circuit through the interlock 123 on the switch G, thereby causing the switch J to open and complete the transition of the motors 10 and 11 from series to parallel.

The resistors 55 and 56 of the accelerator A are reconnected in the motor circuit when the parallel connections are established and the acceleration of the motors is completed by the rollers 19 and 20 of the accelerator being returned to their initial position, thereby shunting the resistors 55 and 56 from the motor circuit. The pilot motor is energized under the control of the limit relay to drive the rollers of the accelerator toward their initial position. The energizing circuit for the pilot motor PM may be traced from positive through the resistor 104, conductor 105, the tickler coil 51, contact members 106 and 107, conductor 108, an interlock 142 on the switch G, conductor 121, the contact segment 67 of the drum 57, conductor 122, the "off" field winding 44 and the armature winding 42 of the pilot motor to negative.

The opening of the contact members 106 and 107 of the limit relay LR will cause the pilot motor to stop its operation in the return direction in the same manner as during its forward operation. Likewise, the closing of the contact members 106 and 115 of the relay LR will cause the pilot motor to reverse its direction of operation and drive the accelerator rollers in a forward direction to reinsert some of the resistors 55 and 56 in the motor circuit in the event the motor current becomes excessive during parallel operation. The circuit for energizing the pilot motor for forward operation at this time may be traced from the contact member 115 of the relay LR through conductor 116, an interlock 143 on the switch P, conductor 113, the segment 68 of the drum switch 57, conductor 114, the "on" field winding 43 and the armature winding 42 of the pilot motor to negative. In this manner, the relay LR functions to control the operation of the pilot motor for either direction of operation of the pilot motor and during both series and parallel operation of the main motors.

As the accelerator A approaches its initial position, the pilot motor PM is deenergized by the interruption of the circuit through the segment 67 of the drum switch 57. Furthermore, an electrical braking circuit is established for the pilot motor to bring it to a quick stop at the end of the accelerator travel. The braking circuit may be traced from one terminal of the armature winding 42 through the field winding 43, conductor 114, the segment 68 of the drum switch 57, conductor 113, an interlock 144 of the switch JR, conductor 145, the segment 69 of the drum switch 57, conductor 146, a portion of the resistor 54, and thence to the other terminal of the armature winding 42 through the negative connection.

As explained hereinbefore, the switches B3 and B4 are closed while the accelerator is being returned to its initial position during parallel operation of the motors, thereby connecting the motors 10 and 11 directly to ground and permitting the accelerator to be returned rapidly to its initial position in preparation for the establishment of the dynamic braking circuit. The energizing circuit for the actuating coils of the switches B3 and B4 may be traced from the previously energized conductor 83 through an interlock 147 on the switch B2, conductor 148, an interlock 149 on the switch JR, conductor 151, the coils of the switches B3 and B4, conductor 152, the segment 59 of the drum switch 57 and conductor 76 to negative.

As indicated in the sequence chart in Fig. 2, the switches F1, F3, F2 and F4 are closed following the closing of the switches B3 and B4, thereby shunting the field windings of the motors 10 and 11 in successive steps to increase the motor speed. The energizing circuit for the switch F1 may be traced from the previously energized conductor 83 through an interlock 153 on the switch B3, conductor 154, an interlock 158 on the switch B2, conductor 159, an interlock 161 on the switch B1, conductor 162, contact members 163 of the relay BR, conductor 164, the coil of the switch F1, conductor 165, the segment 60 of the drum switch 57 and conductor 76 to negative. The circuit for the coil of the switch F3 extends from the conductor 164 through the coil, conductor 166, the segment 61 of the drum switch 57 and conductor 76 to negative. The energizing circuit for the switch F2 extends from the conductor 159 through the coil of the switch F2, conductor 167, the segment 62 of the drum switch 57 and the conductor 76 to negative. The circuit for the coil of the switch F4 extends from the conductor 159 through the coil, conductor 168, the segment 63 of the drum switch 57 and conductor 76 to negative. In this manner, the motors are operated with a weak field to increase the maximum speed attained by the motors in a manner well known in the art.

In order to permit the limit relay LR to have control of the pilot motor while the accelerator is being returned towards its initial position during parallel operation of the main motors interlocks are provided on the switches B3 and B4 for establishing circuits through the contact members of the limit relay to cause the pilot motor to be operated in either direction, depending upon the main motor current, as explained hereinbefore. Thus, a circuit is established through the "off" field winding of the pilot motor from the contact member 107 of the relay LR through conductor 108, an interlock 171 on the switch B1, conductor 172, an interlock 173 on the switch B4, conductor 121, the segment 67 of the drum switch 57, conductor 122, the "off" field winding 44 and the armature winding 42 of the pilot motor to negative. The circuit for the "on" field winding of the pilot motor extends from the contact member 115 of the limit relay LR through conductor 116, an interlock 174 on the switch B4, conductor 175, an interlock 176 on the switch B2, conductor 113, the segment 68 of the drum switch 57, conductor 114, the "on" field winding 43 and the armature winding 42 of the pilot motor to negative. Thus, the limit relay has control of the pilot motor throughout its complete range of operation.

If it is desired to permit the vehicle to coast, the motors 10 and 11 may be disconnected from the power source by actuating the controller MC to the "off" position, thereby deenergizing the actuating coils for the switches LS, R1 and R2. In order to permit a small current to circulate through the motors during coasting of the vehicle, the switches JR, B1, B2, B3 and B4 are closed when the master controller is returned to the "off" position, thereby establishing the dynamic braking circuits for the motors 10 and 11.

However, the circulating current is kept at a low value during coasting, since the resistors of the accelerator A are connected in the motor circuit and the field shunting switches F1 and F3 are closed to shunt the field windings of the motors, thereby reducing their excitation. The switch B5 is also closed at this time to connect the midpoint of the motor circuit to ground, as explained hereinbefore. The energizing circuits for the switches B1 and B2 may be traced from positive through a segment 177 of the braking controller BC, conductor 178, a segment 179 of the controller MC, conductor 181, an interlock 182 on the switch LS, conductor 183, the actuating coils of the switches B1 and B2, conductor 184 and the segment 58 of the drum switch 57 to negative. The energizing circuit for the switch B5 extends from the conductor 183 through the coil of the switch B5, conductor 184 and the segment 58 to negative. A holding circuit for these three switches is established through an interlock 185 on the switch B1.

Following the closing of the switch B1, the switches JR, B3 and B4 are closed. The energizing circuit for the switch JR extends from the conductor 183, through an interlock 186 on the switch B1, conductor 85, the interlock 86 on the switch P, conductor 87, the actuating coil of the switch JR, conductor 88, and the interlock 89 on the switch J to negative. The energizing circuit for the coils of the switches B3 and B4 extends from the conductor 183 through an interlock 187 on the switch B1, conductor 151, the actuating coils of the switches B3 and B4, conductor 152, and an interlock 188 on the switch B2 to negative. The energizing circuit for the switch F1 extends from the conductor 151 through an interlock 189 on the switch B1, conductor 162, contact members 163 of the relay BR, conductor 164, the actuating coil of the switch F1, conductor 165 and an interlock 191 on the switch B2 to negative. The energizing circuit for the switch F3 extends from the conductor 164 through the coil of the switch F3, conductor 166 and an interlock 192 on the switch B2 to negative.

Since the current generated by the machines 10 and 11 during coasting is proportional to the speed of the car, this current may be utilized for spotting the accelerator A, that is, for matching the position of the accelerator with the speed of the car, thereby insuring that the accelerator will be in the proper position for the utilization of dynamic braking to decelerate the car. As previously explained, the accelerator is under the control of the limit relay LR during coasting. The contact members of the limit relay are so connected in the circuit of the pilot motor that it may be operated in either direction depending on the speed of the car. Thus, with the contact members 106 and 107 of the relay LR closed, the pilot motor advances the accelerator to decrease the resistance in the motor circuit until a point is reached at which the motor current is sufficient to operate the limit relay LR to open the contact members 106 and 107. Should the car decrease in speed still further, it would result in lower motor current and contact members 106 and 107 are reclosed to further advance the accelerator.

However, should the car increase in speed during coasting, resulting in a sufficient increase in the motor current to cause the contact member 106 to engage the contact member 115 of the relay LR, the pilot motor will be operated in the reverse direction to return the accelerator towards its initial position, thereby increasing the resistance in the motor circuit and matching the position of the accelerator with the speed of the car. During coasting, the spotting coil 49 of the relay LR is connected across the resistor 48 which is connected in the circuit during both coasting and braking, therefore the relay LR is responsive to the current which circulates through the motors 10 and 11 during coasting. The energizing circuit for the spotting coil 49 may be traced from one terminal of the resistor 48 through conductor 193, an interlock 194 on the switch G1, conductor 195, the spotting coil 49, conductor 196, contact members 197 of the relay BR, conductor 198, an interlock 199 on the switch G1, and conductor 201 to the other terminal of the resistor 48.

During spotting, the circuit for forward operation of the pilot motor may be traced from the contact member 107 of the relay LR, through conductor 108, contact members 202 of the relay CR, conductor 111, an interlock 203 on the switch B1, conductor 113, the segment 68 of the drum switch 57, conductor 114, the "on" field winding 43 and the armature winding 42 of the pilot motor to negative. The circuit for reverse operation of the pilot motor extends from the contact member 115 of the relay LR, through conductor 116, an interlock 204 on the switch B3, conductor 118, the interlock 119 on the switch JR, conductor 121, the segment 67 of the drum switch 57, conductor 122, the "off" field winding 44 and the armature winding 42 to negative.

As explained hereinbefore, the relay CR is utilized to permit operation of the accelerator during coasting and braking but to prevent its advancement while the vehicle is standing still. The operating coil for the relay CR is connected across one motor to ground, thereby being energized by the counter-electromotive force of the motor which is dependent upon the speed of rotation of the motor. The energizing circuit for the coil of the relay CR may be traced from one terminal of the armature 14 of the motor 11 through conductor 101, the switch B2, conductor 193, the interlock 194 on the switch G1, conductor 195, an interlock 205 on the switch B3, conductor 206, the coil of the relay CR, conductor 207, contact members 208 of the relay BR, conductor 209 and an interlock 211 on the switch G1 to ground.

Thus, it will be seen that while the vehicle is moving, the relay CR is energized to close its contact members 202, thereby permitting the limit relay LR to spot the accelerator in the manner herein described. However, when the vehicle is standing, the relay CR is deenergized and the circuit for the forward operation of the motor PM is interrupted by the opening of the contact members 202 which prevents the accelerator from being advanced as a result of an operation of the relay LR which, of course, would normally operate to advance the accelerator since the motor current is below the setting of the limit relay.

Furthermore, when the relay CR is deenergized a circuit is established to operate the accelerator in the reverse direction to return it to its initial position. This circuit may be traced from positive through the resistor 104, conductor 105, an interlock 212 on the switch LS, conductor 213, contact members 214 of the relay CR, conductor 121, the segment 67 of the drum switch 57, conductor 122, the "off" field winding 44 and the armature winding 42 of the pilot motor to negative.

In the event that dynamic braking is desired to decelerate the vehicle, the controller BC is actuated to one of the braking positions, thereby energizing the relay BR to disconnect the spotting coil 49 on the relay LR and to energize the coil 47 on the relay LR. In this manner the relay LR is recalibrated for proper operation during dynamic braking. The relay CR is also recalibrated by the opening of the contact members 208 of the relay BR to insert a resistor 215 in the circuit for the coil of the relay CR.

The operation of the relay BR connects the coil 47 of the relay LR across the resistor 48, as explained hereinbefore. The energizing circuit for the coil 47 may be traced from one terminal of the resistor 48 through conductor 193, the interlock 194 on the switch G1, conductor 195, contact members 216 on the relay BR, conductor 217, the coil 47, conductor 218, the resistor 52, conductor 198, the interlock 199 on the switch G1 and conductor 201 to the other terminal of the resistor 48. The energizing circuit for the actuating coil of the relay BR may be traced from positive through the segment 177 of the controller BC, conductor 178, the segment 179 of the controller MC, conductor 181, a segment 219 of the controller BC, conductor 221, an interlock 222 on the switch B1, conductor 223, and the actuating coil of the relay BR to negative.

The operation of the relay BR also deenergizes the actuating coils for the field shunting switches F1 and F3 by the opening of the contact members 163 on the relay BR. In this manner the field shunting circuit for the motors is removed, thereby applying full field strength to the motors to cause them to build up a dynamic braking current.

As explained hereinbefore, the air pressure relay C is utilized to vary the energizing current for the coil 47 on the relay LR by shunting portions of the resistor 52 from the circuit for the coil 47 in accordance with the pressure applied to the relay C which is connected to the air brake system. As shown, the relay C is provided with contact members 224 which are disposed to shunt portions of the resistor 52 through conductors 225, 226 and 198 in a step-by-step manner as the air pressure is increased on the relay C. In this manner the calibration of the limit relay LR is dependent upon the air brake pressure and, accordingly, the relay LR functions to regulate the dynamic braking current in accordance with the pressure in the air brake system. Thus, it will be seen that a maximum dynamic braking effect may be obtained simultaneously with the maximum air braking effect, thereby coordinating the air and the electric braking systems as described in my aforementioned copending application.

From the foregoing description it is apparent that I have provided an automatic control system of the accelerator type suitable for controlling series-parallel operation of the propelling motors of an electric vehicle in which the accelerator is at all times under the control of a limit relay. The system provides for single car operation or multiple operation of a number of cars connected in a train. The structure of the accelerator is simplified, as compared with previously known structures, since the accelerator travels in one direction for series and dynamic braking operations of the motors and in the opposite direction for parallel operation.

Since many modifications may be made in the apparatus and arrangement of parts without departing from the spirit of my invention, I do not wish to be limited other than by the scope of the appended claims.

I claim as my invention:

1. In a motor control system, in combination, a plurality of motors, switching means for connecting the motors to the power source in series-circuit relation, additional switching means for connecting the motors in parallel-circuit relation to the power source, a reversible accelerator for controlling the motor current, interlocking means actuated by said switching means for controlling the direction of operation of said accelerator, means actuated by the accelerator for controlling the operation of said switching means, and relay means responsive to the motor current for also controlling the direction of operation of the accelerator.

2. In a motor control system, in combination, a plurality of motors, switching means for connecting the motors to a power source in series-circuit relation, additional switching means for connecting the motors in parallel-circuit relation to the power source, a reversible accelerator for controlling the motor current, interlocking means actuated by said switching means for controlling the direction of operation of said accelerator, means actuated by the accelerator for controlling the operation of said switching means, and relay means responsive to the motor current for controlling the direction and the rate of operation of the accelerator.

3. In a motor control system, in combination, a plurality of traction motors, switching means for connecting the motors to a power source in series-circuit relation, additional switching means for connecting the motors in parallel-circuit relation to the power source, an accelerator comprising a plurality of resistor sections for controlling the motor current, a plurality of contact members for shunting the resistor sections, a pair of rollers for actuating the contact members, a pilot motor for operating the rollers in one direction during series operation of the traction motors and in the opposite direction during parallel operation, and relay means responsive to the traction motor current for controlling both the direction and the speed of the pilot motor.

4. In a motor control system, in combination, a plurality of traction motors, switching means for connecting the motors to a power source in series-circuit relation, additional switching means for connecting the motors in parallel-circuit relation to the power source, an accelerator comprising a plurality of resistor sections for controlling the motor current, a plurality of contact members for shunting the resistor sections, a pair of rollers for actuating the contact members, a pilot motor for operating the rollers in one direction during series operation of the traction motors and in the opposite direction during parallel operation, interlocking means actuated by said switching means for controlling the direction of operation of the pilot motor, and relay means responsive to the traction motor current for also controlling the direction of operation of the pilot motor.

5. In a motor control system, in combination, a plurality of traction motors, switching means for connecting the motors to a power source in series-circuit relation, additional switching means for connecting the motors in parallel-circuit relation to the power source, an accelerator comprising a plurality of resistor sections for controlling the motor current, a plurality of contact members for shunting the resistor sections, a pair of rollers for actuating the contact members, a pilot motor for operating the rollers in one direction during series operation of the traction motors and in the opposite direction during parallel operation, interlocking means actuated by said switching means for controlling the direction of operation of the pilot motor, means actuated by the accelerator for controlling the operation of said switching means, and relay means responsive to the traction motor current for reversing the pilot motor during either series or parallel operation.

6. In a motor control system, in combination, a plurality of traction motors, switching means for connecting the motors to a power source in series-circuit relation, additional switching means for connecting the motors in parallel-circuit relation to the power source, an accelerator comprising a plurality of resistor sections for controlling the motor current, a plurality of contact members for shunting the resistor sections, a pair of rollers for actuating the contact members, a pilot motor for operating the rollers in one direction during series operation of the traction motors and in the opposite direction during parallel operation, interlocking means actuated by said switching means for controlling the direction of operation of the pilot motor, means actuated by the accelerator for controlling the operation of said switching means, and relay means responsive to the traction motor current for also controlling the direction of operation of the pilot motor.

7. In a motor control system, in combination, a plurality of traction motors, switching means for connecting the motors to a power source in series-circuit relation, additional switching means for connecting the motors in parallel-circuit relation to the power source, an accelerator comprising a plurality of resistor sections for controlling the motor current, a plurality of contact members for shunting the resistor sections, a pair of rollers for actuating the contact members, a pilot motor for operating the rollers in one direction during series operation of the traction motors and in the opposite direction during parallel operation, interlocking means actuated by said switching means for controlling the direction of operation of the pilot motor, means actuated by the accelerator for controlling the operation of said switching means, and relay means responsive to the traction motor current for controlling both the direction and the speed of the pilot motor.

8. In a motor control system, in combination, a plurality of traction motors, switching means for connecting the motors to a power source first in series-circuit relation and then in parallel-circuit relation to accelerate the motors, additional switching means for establishing dynamic braking connections for the motors, a reversible accelerator for controlling the motor current during both acceleration and dynamic braking, and means for operating the accelerator in the same direction during series operation of the motors and during dynamic braking and in the opposite direction during parallel operation.

9. In a motor control system, in combination, a plurality of traction motors, switching means for connecting the motors to a power source first in series-circuit relation and then in parallel-circuit relation to accelerate the motors, additional switching means for establishing dynamic braking connections for the motors, a reversible accelerator for controlling the motor current during both acceleration and dynamic braking, means for operating the accelerator in the same direction during series operation of the motors and during dynamic braking and in the opposite direction during parallel operation, and interlocking means actuated by said switching means for controlling the direction of operation of the accelerator.

10. In a motor control system, in combination, a plurality of traction motors, switching means for connecting the motors to a power source first in series-circuit relation and then in parallel-circuit relation to accelerate the motors, additional switching means for establishing dynamic braking connections for the motors, a reversible accelerator for controlling the motor current during both acceleration and dynamic braking, means for operating the accelerator in the same direction during series operation of the motors and during dynamic braking and in the opposite direction during parallel operation, interlocking means actuated by said switching means for controlling the direction of operation of the accelerator, and means actuated by the accelerator for controlling the operation of said switching means.

11. In a motor control system, in combination, a plurality of traction motors, switching means for connecting the motors to a power source first in series-circuit relation and then in parallel-circuit relation to accelerate the motors, additional switching means for establishing dynamic braking connections for the motors, a reversible accelerator for controlling the motor current during both acceleration and dynamic braking, means for operating the accelerator in the same direction during series operation of the motors and during dynamic braking and in the opposite direction during parallel operation, interlocking means actuated by said switching means for controlling the direction of operation of the accelerator, means actuated by the accelerator for controlling the operation of said switching means, and relay means responsive to the motor current for also controlling the direction of operation of the accelerator.

12. In a motor control system, in combination, a plurality of traction motors, a power conductor, switching means for connecting the motors to the power conductor first in series-circuit relation and then in parallel-circuit relation to accelerate the motors, additional switching means for establishing dynamic braking connections for the motors, a reversible accelerator for controlling the motor current during both acceleration and dynamic braking, means for operating the accelerator in the same direction during series operation of the motors and during dynamic braking and in the opposite direction during parallel operation, interlocking means actuated by said switching means for controlling the direction of operation of the accelerator, means actuated by the accelerator for controlling the operation of said switching means, and relay means responsive to the motor current for controlling the direction and the rate of operation of the accelerator during both acceleration and dynamic braking.

GEORGE R. PURIFOY.